United States Patent [19]

Mikoshiba et al.

[11] 4,160,932
[45] Jul. 10, 1979

[54] METHOD OF DRIVING FLAT DISCHARGE PANEL

[75] Inventors: Shigeo Mikoshiba, Tokyo; Shinichi Shinada, Kokubunji, both of Japan

[73] Assignee: Hitachi, Ltd., Japan

[21] Appl. No.: 785,849

[22] Filed: Apr. 8, 1977

[30] Foreign Application Priority Data

Apr. 9, 1976 [JP] Japan .................................. 51-39350

[51] Int. Cl.² ...................... H05B 37/00; H05B 39/00; H05B 41/00
[52] U.S. Cl. ................................ 315/169.4; 340/775
[58] Field of Search ............ 315/169 TV; 340/324 M; 358/169, 241, 59

[56] References Cited
U.S. PATENT DOCUMENTS

3,619,700  11/1971  Kupsky .................................. 313/217

Primary Examiner—Alfred E. Smith
Assistant Examiner—Robert E. Wise
Attorney, Agent, or Firm—Craig and Antonelli

[57] ABSTRACT

A method of driving a memory panel having first electrode, second electrode, third electrode for discharging upon application of an applied voltage for first discharge via first discharge space between first and third electrodes and for discharging upon application of an applied voltage for second discharge via second discharge space forming part of first discharge space between second and third electrodes, a plurality of gas discharge cells filled sealingly with discharging gas in said respective discharge spaces, and series resistors provided in said respective third electrodes, comprising a step of varying the applied voltage for first or second discharge spaces or both voltages therefor in such a manner that a self-supporting discharge exists only in either one of said first and second discharge spaces.

8 Claims, 35 Drawing Figures

METHOD OF DRIVING FLAT DISCHARGE PANEL

BACKGROUND OF THE INVENTION

1. Field of the Invention

This invention relates to a method of driving a flat discharge display panel for displaying numbers, characters, pictures, etc. utilizing D.C. gas discharge.

2. Description of the Prior Art

A flat discharge display element having a memory function utilizing the conventional gas discharge includes, for example, (1) A.C. plasma panel,
(2) D.C. memory panel with resistor,
(3) abnormal-glow D.C. memory panel,
(4) pulsed gas-discharged panel with memory,
(5) electron-acceleration type discharge panel, etc.

The operational principle and disadvantages of the respective memory types described above will now be described.

The panel listed in (1) provides a memory function by utilizing the polarity of wall discharge generated upon discharging, and accordingly has a difficulty in color display and large power loss caused by the capacitive current.

The panel listed in (2) has series protecting resistors connected to respective discharge display elements to provide a memory function by the difference between break-down voltage and extinction voltage, and accordingly has small memory margin due to irregularity of protective resistance values, slow switching speed, low light-emitting efficiency due to usage of negative glow, and difference of half-select cell and non-select cell.

The panel listed in (3) serves to adjust cathode material, filled gas, etc. to thereby raise a discharge sustain voltage to thus provide a memory function due to the difference between break-down voltage and extinction voltage, and accordingly has low efficiency due to high discharge voltage, large irregularity in discharge current and discharge voltage, slow switching speed, and difference of luminances between half-select cell and non-select cell as its disadvantages.

The panel listed in (4) provides a memory function by utilizing a phenomenon that the breakdown voltage of the following pulses varies upon existence of space charge generating pulsed gas discharge. Since this panel utilizes pulse discharge, it provides low efficiency, narrow operational margin, complicated structure, etc. as its disadvantages.

The panel listed in (5) serves to tentatively vary the phase difference of applied voltage pulse for main and auxiliary power pulse and to control space charge so as to thereby provide a memory function. This panel has large auxiliary power loss, low efficiency, complicated structure, and strict limitation to power source.

The inventor of this invention has already proposed U.S. patent application Ser. No. 725,629 entitled "Method of Driving Memory Panel" for operating a discharge display panel as a memory panel based on novel operational principle. The discharge display panel used for this novel drive method has first electrode becoming X-axis (display discharge anode), second electrode becoming Y-axis (auxiliary discharge anode), and third electrode (cathode) forming discharge with these first and second electrodes in a discharge display element as a matrix panel consisting of resistors connected in series in every third electrode forming the respective discharge display elements so as to provide a memory function to drive the panel by varying applied voltage between the first and third electrodes (display discharge space) and applied voltage between the second and third electrodes (auxiliary discharge space).

This novel drive method has almost solved all difficulties in the prior art technique, but the construction of the discharge panel is limited as described above, and restriction existed in the structure of the discharge display element and method of driving the same.

Further, a drive voltage required for conducting memory function (a voltage required for shifting the discharge between the display discharge space and the auxiliary discharge space) is relatively high at 200 to 400 volts thereby requiring large pulse voltage for the addresses, such that switching operation is difficult.

SUMMARY OF THE INVENTION

One object of this invention is to provide a method of driving a flat discharge panel which may eliminate problems retained in the prior invention and which may operate with relatively low driving voltage adapted for a memory panel using discharge display panel of various constructions.

In order to perform the aforementioned object of this invention, there is provided a method of driving a flat discharge panel employing discharge display panel fundamentally comprising first electrode, second electrode, third electrode for discharging upon application of an applied voltage for first discharge via first discharge space between first and third electrodes and for discharging upon application of an applied voltage for second discharge via second discharge space having part of first discharge space or forming part of first discharge space between second and third electrodes, plural gas discharge cells filled sealingly with discharging gas in the discharge spaces and series resistors connected internally or externally of the panel to the respective third electrodes, and series resistors further provided in said first and second electrodes as required. This discharge display panel also employs a method of driving the panel by varying applied voltage for first or second discharge or both voltages therefor in such a manner that a self-supporting discharge exists only in either one of said first and second discharge spaces.

The discharge display panel of this type will hereinafter be called "discharge shift type memory panel" herein. Said panel may form a matrix with respective image elements (respective discharge display elements) or may form character, number or signal display having plural segments.

This invention will now be described in detail with reference to accompanying drawings, but a panel forming a matrix will now be described for convenience of simplified description.

DESCRIPTION OF THE PREFERRED EMBODIMENTS

Figure 1:
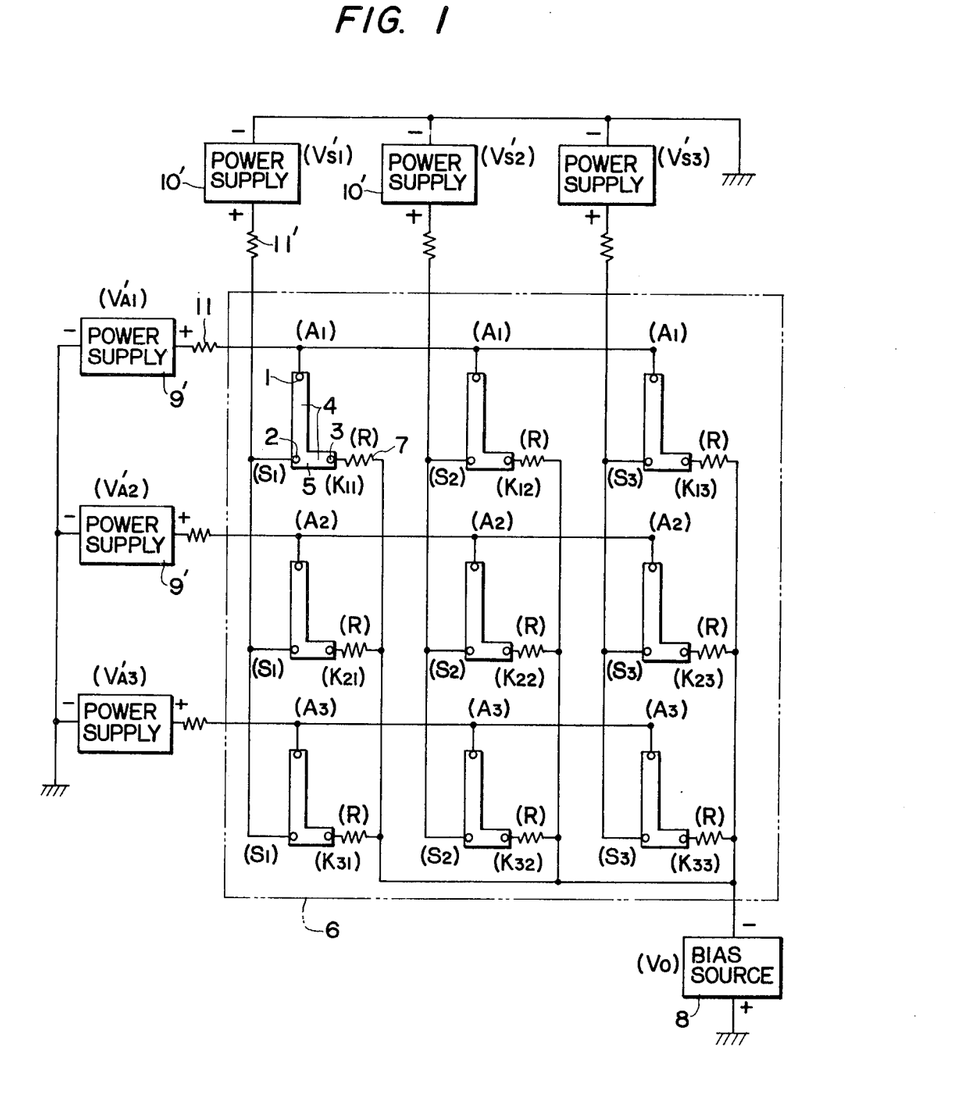
FIG. 1 is a circuit diagram of a panel for driving a discharge shift type matrix constructed according to this invention.
Figure 2:
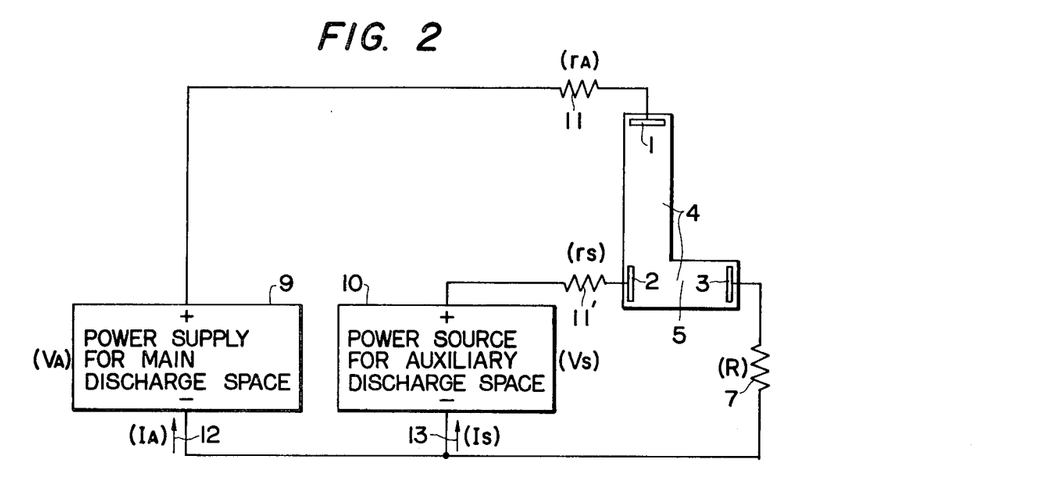
FIG 2 is a circuit diagram of single discharge cell of discharge shift type matrix panel.

FIG. 1 shows a circuit diagram showing the fundamental concept of the discharge shift type $3 \times 3$ matrix panel. FIG. 2 shows a single discharge display element in FIG. 1. It should be noted that FIGS. 1 and 2 show only one example of the discharge shift type panel but this invention may not be limited only to this.

In FIGS. 1 and 2, reference numeral 1 represents first electrode, 2 second electrode, 3 third electrode, 4 first discharge space, 5 second discharge space, 6 matrix panel, 7 resistors connected in series with the third electrode 3, 8 bias power source, 9 a power source for applying a voltage to first discharge space having sum of the bias power source 8 and an auxiliary power source 9' for applying a voltage to the first discharge space, 10 a power source for applying a voltage to second discharge space having sum of the bias power source 8 and an auxiliary power source 10' for applying a voltage to the second discharge space, 11 first electrode protecting resistor, 11' second electrode protecting resistor, 12 first discharge current, and 13 second discharge current. The protecting resistors 11 and 11' may also be externally attached to outside of the panel as shown in FIG. 1, and may also be internally attached to inside of the panel in the respective discharge spaces.

For convenience of simplifying the description, the same reference numerals and characters in respective Figures designate the same or equivalent parts and components, and the first electrode 1 is designated as display discharge anode (A), the second electrode 2 as auxiliary discharge anode (S), the third electrodes 3 as common cathode (K), the first discharge space 4 as display discharge space, the second discharge space 5 as auxiliary discharge space. Furthermore, the resistance value of the resistor 7 is represented by R, the resistance value of the resistor 11 is by $r_A$, the resistance value of the resistor 11' by $r_S$, the voltage of the bias power source by $V_0$, the voltage of the power source 9 by $V_A$, the voltage of the auxiliary power source 9' by $V_A'$, the voltage of the power source 10 by $V_S$, the voltage of the power source 10' by $V_S'$, the current value of the first discharge current 12 by $I_A$, and the current value of the second discharge current 13 by $I_S$.

Since the display discharge (produced between A and K) and auxiliary discharge (produced between S and K) use common resistance R of the resistor 7, the discharge can exist only in either of the display and auxiliary discharge spaces. The difference between the voltage for forcing the discharge from the auxiliary discharge space to the display discharge space such as, for example, $V_A(ON)$, $V_S$ and the voltage for forcing the discharge from the display discharge space to the auxiliary discharge space such as, for example, $V_A$ (OFF), $V_S$, i.e., the discharge shift voltage provides a memory operational margin. If the value $V_A$ exists between the aforesaid $V_A(ON)$ and $V_A(OFF)$, the discharge can exist in either of the display and auxiliary discharge space. Accordingly, $V_A$ is, for example, increased to $V_A(ON)$ (in address state) and is returned to between $V_A(ON)$ and $V_A(OFF)$ to thus store an address signal (in discharge sustain state).

Even if the polarities of the respective discharge of the display and auxiliary state are simultaneously inverted, similar memory operation can be obtained.

The principle of the memory drive operation generally described heretofore will further be described in more detail. The condition that the display discharge is on, which will be hereinbelow represented by $I_A$ on, and the auxiliary discharge is on, which will hereinbelow be represented by $I_S$ on, and both currents flow simultaneously will first be investigated. From FIG. 2, $$V_{am} = V_A - (I_A + I_S) \cdot R - I_A r_A$$

$$V_{Sm} = V_S - (I_A + I_S) \cdot R - I_S r_S$$

hold true. Where $V_{Am}$ and $V_{Sm}$ illustrate respectively display discharging maintenance voltage and auxiliary discharging maintenance voltage. From the above equations, $$I_A = \frac{(V_A - V_{Am})(R + r_S) - (V_S - V_{Sm})R}{R r_A + r_A r_S + r_S R} \quad (1)$$

$$I_S = \frac{(V_S - V_{Sm})(R + r_A) - (V_A - V_{Am})R}{R r_A + r_A r_S + r_S R} \quad (2)$$

and thus obtained. In order to provide $I_A > 0$, from the equation (1), $$V_A > V_{Am} + (V_S - V_{Sm}) R/(R + r_S) \equiv V_{A1} \quad (3)$$

In order to maintain $I_S > 0$, from the equation (2), $$V_A < V_{Sm} + (V_S - V_{Sm})(R + r_A)/R \equiv V_{A2} \quad (4)$$

and accordingly the range of $V_A$ with respect to a certain value of $V_S$ becomes from the equations (3) and (4)

$$V_{A2} - V_{A1} = (V_S - V_{Sm})(R r_A + r_A r_S + r_S R)/R(R + r_S) \quad (5)$$

similarly, the range or $V_S$ with respect to certain value of $V_S$ becomes $$(V_A - V_{Am})(R r_A + r_A r_S + r_S R)/R(R + r_A) \quad (6)$$

The features of the method of driving the memory panel of this invention are to reduce to as small a range as possible $V_A$ and $V_S$ under the condition that $I_A$ and $I_S$ given by the formulae (5) and (6) become simultaneously on. More particularly, from the equations (5) and (6)

$$R > r_A, r_S$$

to sufficiently reduce the value given by the right side of the equation (5) or the equation (6). The values of $r_A$, $r_S$ may be zero. However, if the difference between $V_A$ and $V_S$ becomes excessively large, an arc discharge occurrs between A and S resulting in possibility of breakage of the discharge display element.

Figure 3:
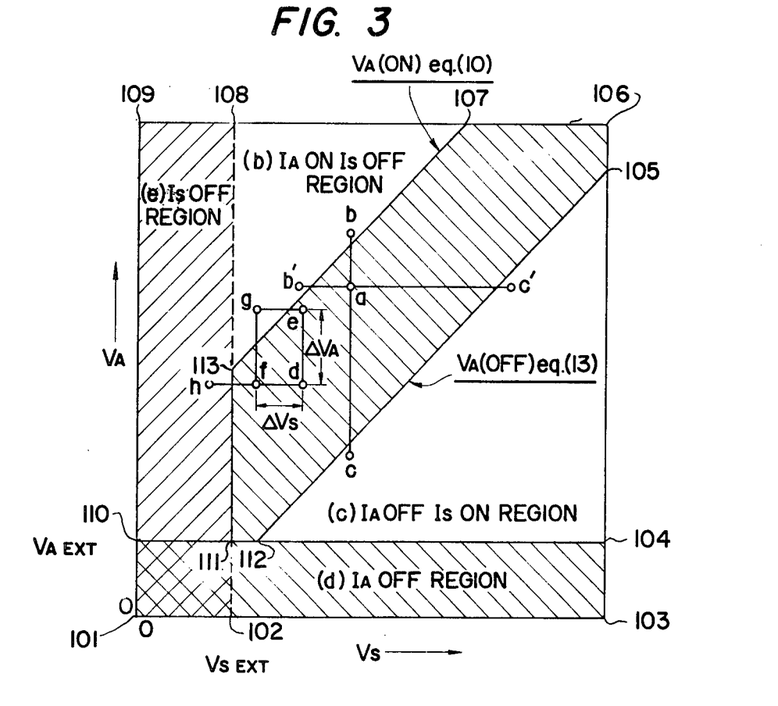
FIG. 3 is a static characteristic view showing the operation in case the discharge shift type matrix panel is driven as memory.

FIG. 3 shows a static characteristics of the operation of the discharge shift type matrix panel driven in memory.

The operation will be described under the condition that $R > r_A$, $r_S$. In considering the state that $I_S$ is on and $I_A$ is off in FIG. 2, the voltage V (S−K) between S and K and the voltage V(A−K) between A and K become $$V(S-K) = V_{Sm} = V_S - I_S R \quad (8)$$

$$V(A-K) = V_A - I_S R = V_A - V_S + V_{Sm} \quad (9)$$

This operational point is designated at point a in FIG. 3.

Then, when the voltage $V_S$ is retained constant and the voltage $V_A$ is gradually increased, the voltage V(A−K) becomes equal to the breakover voltage for discharge $V_{Abd}$ when $I_S$ on, and the discharge is shifted from between S and K to between A and K. The value of the voltage $V_A$ at this time, i. e. $V_A$(on) becomes as follows using the equation (9)

$$V_A(\text{on}) = V_S + (V_{Abd} - V_{Sm}) \quad (10)$$

as designated at point b in FIG. 3. The voltage $V_A$(on) is represented as a function of $V_S$ in FIG. 3.

Thus, when the display discharge becomes on and the auxiliary discharge becomes off, $$V(A-K) \equiv V_{Am} = V_A - I_A R \quad (11)$$

$$V(S-K) = V_S - I_A R = V_S - V_A + V_{Am} \quad (12)$$

are obtained (at the points b and a in FIG. 3)

On the contrary, when the voltage $V_S$ is retained constant and the voltage $V_A$ is lowered, when the voltage becomes $$V(S-K) = V_{Sbd}$$

the discharge is again shifted to between S and K, where $V_{Sbd}$ is breakover voltage for auxiliary discharge when $I_A$ on.

The value of the voltage $V_A$ at this time, i.e., $V_A$(off) becomes as follows from the equation (12)

$$V_A(\text{off}) = V_S - (V_{Sbd} - V_{Am}) \quad (13)$$

(at the point c in FIG. 3). $V_A$(off) is shown as a function of $V_S$ in FIG. 3. In FIG. 3, the region designated by (a), i.e., the region designated by 105-106-107-113-111-112, is bi-stable area where $I_A$ and $I_S$ can become on and off, the region designated by (b), i.e., the region designated by 107-108-113 is the area where $I_A$ is on and $I_S$ is off, and the region designated by (c), i.e., the region designated by 104-105-112 is the area where $I_A$ is off and $I_S$ is on.

If the display and auxiliary discharge are all operated in normal glows, $V_{Abd}$, $V_{Sbd}$, and $V_{Sm}$ take predetermined value, and accordingly the equations (10) and (13) become rectilinear of gradient 1 in FIG. 3. It is to be noted that both the equations (10) and (13) do not contain I and R so that the memory operation does not depend upon the value of R.

The memory margin M is defined as follows under the condition that $V_S$ is maintained constant:

$$M = \{V_A(\text{on}) - V_A(\text{off})\} / \tfrac{1}{2} V_A(\text{on}) \quad (14)$$

From the equations (10) and (13), the following formula can be obtained.

$$V_A(\text{on}) - V_A(\text{off}) = (V_{Abd} - V_{Am}) + (V_{Sbd} - V_{Sm}) \quad (15)$$

but since there exist $V_{Abd} > V_{Am}$, $V_{Sbd} > V_{Sm}$, M holds always positive values.

One of the features of the method of driving the memory panel of this invention is such that the value of $V_A$(on) − $V_A$(off) represented by the equation (15) by varying the structure of the discharge display element forming the discharge shift type memory panel can be arbitrarily selected in the range that the panel is broken by the discharge. More particularly, if the gap between the display discharge anode (A) and the auxiliary discharge anode (S) is reduced, the right side of the formula (15) takes small value, and if the gap therebetween is increased, the right side of the formula (15) takes large value.

The memory operation of the memory panel by varying the voltage $V_A$ while the voltage $V_S$ is remained constant has heretofore been described, but the same result can be obtained only be exchanging the suffix A to S and S to A in the above equations even if the voltage $V_S$ is varied while the voltage $V_A$ is retained constant. More particularly, if the panel of the discharge sustain state at the point a in FIG. 3 is reduced to the point b' of the voltage $V_S$ while the voltage $V_A$ is remained constant, the discharge becomes on, and if the voltage $V_S$ is raised to the point c', the display discharge becomes off.

In addition to the discharge shift phenomenon described as above, there are another limits in the fundamental operations of the discharge that $I_A$ and $I_S$ cannot take the values below the minimum discharging current $I_{Amin}$, $I_{Smin}$ defined by the shape of discharging tubes, nature of the gap filling, etc. More particularly, assuming that $V_{Aext}$ represents the minimum supply voltage for maintaining voltage for maintaining the display discharge sustain in case the mutual action with the auxiliary discharge is ignored and $V_{Sext}$ indicates the minimum supply voltage for maintaining voltage for maintaining the auxiliary discharge in case the mutual action with the display discharge is ignored, when the following formulae for $V_A$ and $V_S$ are satisified, $$V_A < V_{Aext} \equiv V_A + I_{Am} R \quad (16)$$

$$V_S < V_{Sext} \equiv V_{Sm} + I_{Sm} R \quad (17)$$

the display or auxiliary discharge become off regardless of the other discharge. This is the region designated by (d) in FIG. 3, i.e., the region designated by 101-103-104-110, and the region designated by (e) in FIG. 3, i.e., the region designated by 101-102-108-109. However, since $V_{Aext}$ and $V_{Sext}$ depend upon the values of $I_{Amin}$ and R, there exist irregularity in every discharge cell including the irregularity caused by the irregularity of the resistance value R.

It is considered as to the single discharge cell shown in FIG. 2 that the display discharge anode and the auxiliary discharge anode are horizontally and vertically, respectively connected commonly to be arranged in matrix shape in a panel as shown in FIG. 1.

In FIG. 1, if the voltages represented by the following equations are applied, $$V_{A1}' + V_o = V_{A2}' + V_o = V_{A3}' + V_o \equiv V_A \; (> V_{Aext}) \quad (18)$$

$$V_{S1}' + V_o = V_{S2}' + V_o = V_{S3}' + V_o \equiv V_S \; (> V_{Sext}) \quad (19)$$

since the auxiliary discharge is normally easier in discharge than the display discharge, all the auxiliary discharge become on, the operational points of the respective discharge display cells become convergent to the point d, but the main discharge is remained cancelled.

The discharge display cell at the cross point of the display discharge anode in line m and the auxiliary discharge anode in row n is designated by $(A_m, S_n)$ and the symbols as shown in FIG. 1 are provided for the display discharge anode, auxiliary discharge anode, common cathode. In case, for example, the display discharge of $(A_2, S_2)$ is desired to be on, $V_{A2}'$ is raised by $\Delta V_A$, and $V_{S2}'$ is lowered by $\Delta V_S$. As a result, the point d of $(A_2, S_2)$ is moved to the point g in FIG. 3 to enter into the region of $I_4$ on.

On the other hand, the discharge cell in half-selecting condition of $(A_2, S_1)$, $(A_2, S_2)$ are moved to the point e and the discharge cell in half-selecting condition of $(A_1, S_2)$, $(A_3, S_2)$ are moved to the point f, but the discharge state is not varied. The discharge cell in non-select condition of $(A_1, S_1)$, $(A_1, S_3)$, $(A_3, S_1)$, $(A_3, S_3)$ are retained at the point d.

The discharge current at the point of half-selecting condition and accordingly the luminance is varied in the memory panel of the conventional type as designated by the above paragraphs (2) to (4) with the result that there occurs a phenomenon that the display image trails in parallel with the electrode. However, since the method of memorizing by the memory panel of this invention conducts one of the half-selection with the auxiliary discharge anode, if the display discharge anode and the auxiliary discharge anode are connected horizontally and vertically, respectively as shown, for example, in case of TV display in FIG. 1, there occurrs no variations of the display discharge current by the half-selection.

In case of TV display, it is, for example, addressed for each horizontal line along the display discharge anode. If suitable timing gap is provided in one frame period so that one horizontal line is addressed, for example, 6 times, an image of 6 bits, i.e., 64 tone wedges can be obtained.

The auxiliary discharge is unnecessary from one line addressing to the next addressing, and accordingly if the voltage $V_S$ is lowered after the addressing is completed to lower the operational point of the discharge display cell from the point d to the point h in FIG. 2, the auxiliary discharge power can be saved without affecting the display discharge. However, before the one line is again addressed, the operational point of the discharge display cell must be returned from the point h to the point d. The speed for returning the point from the point h to the point d can be considered to perform for several microseconds if the auxiliary discharge spaces are, for example, coupled vertically via through holes or slots. Because when the auxiliary discharge of certain line is desired to become on, the auxiliary discharge of the line is already on to cause the on state to introduce to discharge for a roll of trigger. However, it is necessary to provide a reset discharge for exclusive auxiliary discharge trigger on first line.

Figure 4A:
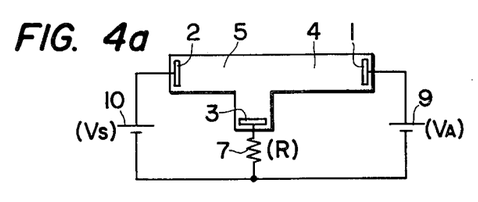
FIGS. 4a to 4c are model views of the structure that the discharge display element of the discharge shift type panel can employ.
Figure 4B:
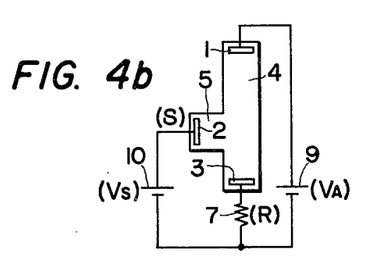

FIG. 2 shows the constitution of one cell of the discharge shift type panels adapted for the method of driving the memory panel of this invention, but this invention can employ other various types of constructions. For example, the construction shown in FIGS. 4a, 4b and 4c can become the discharge shift type panel. The alternations of these construction can also be applied to the memory panel of this invention. As exemplified in FIG. 4c, there are various method of applying potential to the panel as shown in FIGS. 5a, 5b, 5c and 5d in addition to that shown in FIG. 4c.

Figure 4C:
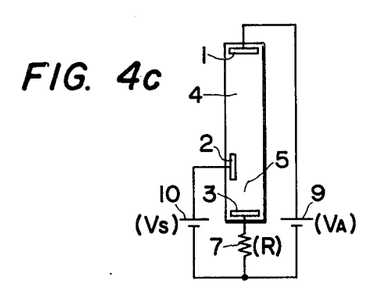
Figure 5A:
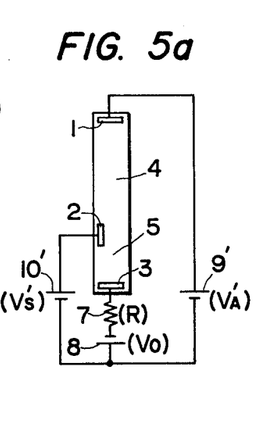
FIGS. 5a to 5d are views showing a method of applying potential enabling of employing by the discharge display element of the structure shown in FIG. 4c.

$V_A$ and $V_S$ in FIG. 3 correspond to $V_A$ and $V_S$ in FIG. 4c. The relationship between the potentials of various power sources 8, 8', 9, 9', 9'', 10, 10', 10'', 10''' in FIGS. 5a to 5d becomes as follows:

$V_0 + V_A' = V_A, \ V_0 + V_S' = V_S$ (FIG. 5a)

Figure 5B:
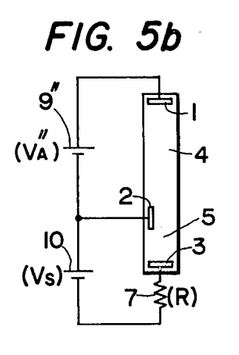

$V_S + V_A'' = V_A$ (FIG. 5b)

Figure 5C:
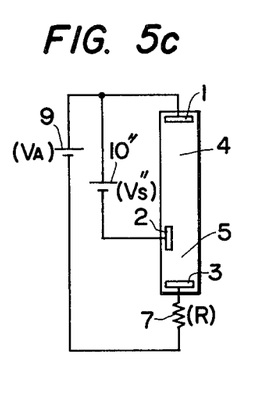

$V_A - V_S'' = V_S$ (FIG. 5c)

Figure 5D:
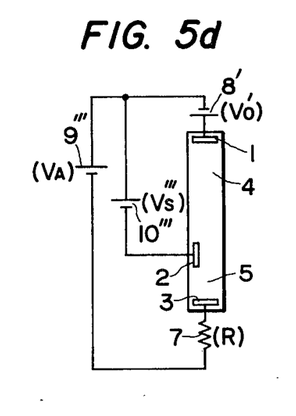

$V_0' + V_A''' = V_A, \ V_A''' - V_S''' = V_S$ (FIG. 5d)

Further, polarities of all the power source can simultaneously be inverted. As described previously, the resistor can not only be attached to the cathode, but be attached to anode, auxiliary anode or both the anode and the auxiliary anode.

The method of this invention will now be described in more detail with reference to the embodiments shown in Figures.

Figure 6A:
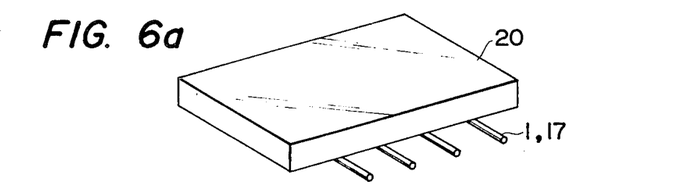
FIGS. 6, 9, 10 and 11 are perspective and assembling sectional views showing the structure of the discharge shift type matrix panel for executing the method of this invention.
Figure 6B:
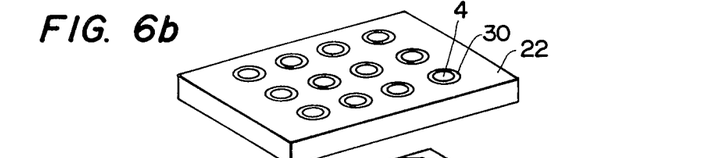
Figures 6C, 6D:
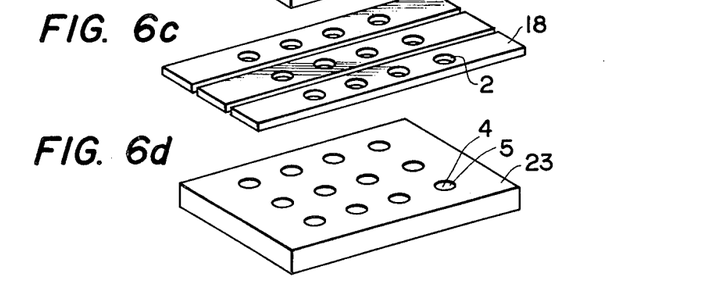
Figure 6E:
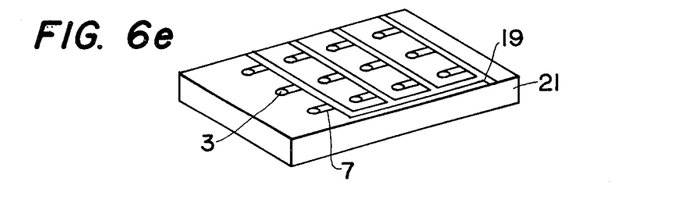
Figure 6F:
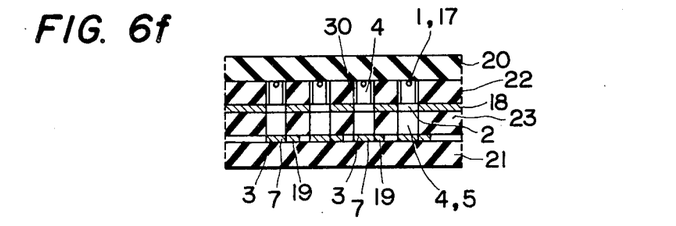

FIG. 6a to 6e are exploded perspective views of the discharge shift type matrix panel for executing the method of this invention, and FIG. 6f is a sectional view of the assembled panel. The symbols in FIGS. 6a to 6f are the same as those shown in FIGS. 1, 2, 4, and 5. Reference numeral 1 illustrates a display discharge anode, 2 an auxiliary discharge anode, 3 a common cathode, 4 a display discharge space, 5 an auxiliary discharge space, and 7 resistors. 17 indicates a display discharge anode leads, 18 auxiliary discharge anode leads, 19 common cathode leads, 20 transparent insulating plate, 21 insulating substrate, 22 porous spacer for the display discharge space, 23 porous spacer for the display and auxiliary discharge spaces, and 30 a luminous material provided on the display discharge space wall. The luminous material is provided on inner surface of the holes of the spacer 22 or part of the plate 20, or on both the inner surface of the spacers 22 and part of the plate 20.

Figure 7:
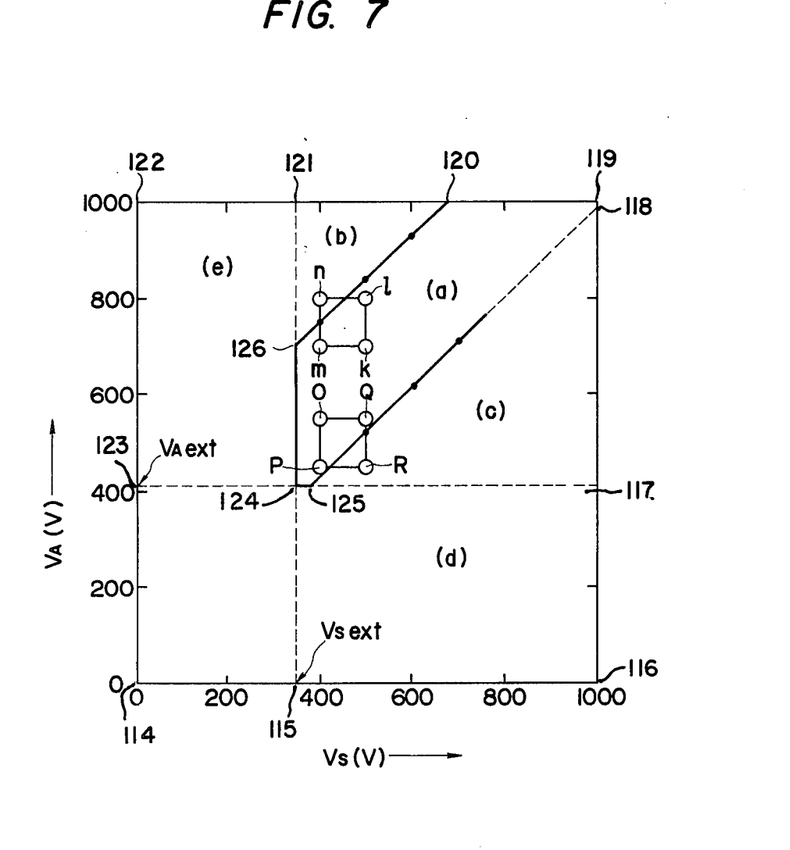
FIG. 7 is a memory operation characteristic view of the panel shown in FIG. 6.

These parts and components are integrally sealed so that the respective discharge spaces are airtightly sealed from outside and suitable gas is filled therein. The static characteristics obtained when the panel is connected as shown in FIGS. 5a to 5d and potential is applied thereto is shown in FIG. 7. In this case, the resistors 7 employ 2 MΩ, but the static characteristics has retained substantially the same as shown in FIG. 7 even if other values were used. This shows that even if one of the values of the resistors 7 is irregular in the panel, the memory function of the panel is not largly affected. However, $V_{Aext}$ and $V_{Sext}$ are affected by the values of the resistors 7, but $V_{Aext}$ and $V_{Sext}$ are not employed for providing the memory function in the method of driving the memory panel of this invention. In FIG. 7, assume that the region surrounded by 124-125-118-119-126 is represented by (a), the region by 120-121-126 by (b), the region by 117-118-125 by (c), the region by 114-116-117-123 by (d), and the region by 114-115-121-122 by (e), the regions designated by (a) to (e) correspond to the regions designated by (a) to (e) in FIG. 3, respectively.

The discharge shift type panel can switch also by a pulse voltage. More particularly, in FIG. 3, if $\Delta V_A$ and $\Delta V_S$ are substantially simultaneously applied and thereafter $\Delta V_A$ and $\Delta V_S$ are excluded, the panel operational point is instantaneously moved from the point d to the point g in FIG. 3 and is again returned to the point d. If the initial state is in $I_A$off and $I_S$on, the panel becomes $I_A$on and $I_S$off when the point is returned again to the point d.

Figure 8A:
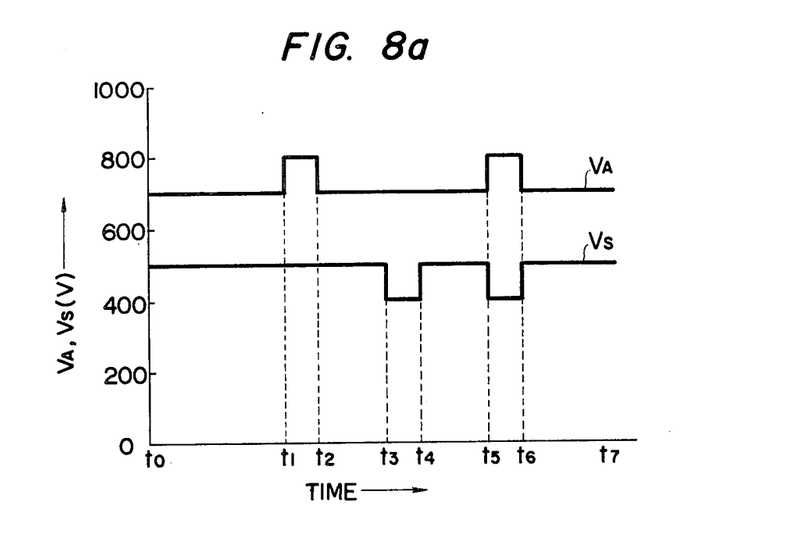
FIGS. 8a and 8b are timing charts of the maveforms of the panel applied voltage in case for driving the panel shown in FIG. 6.
Figure 8B:
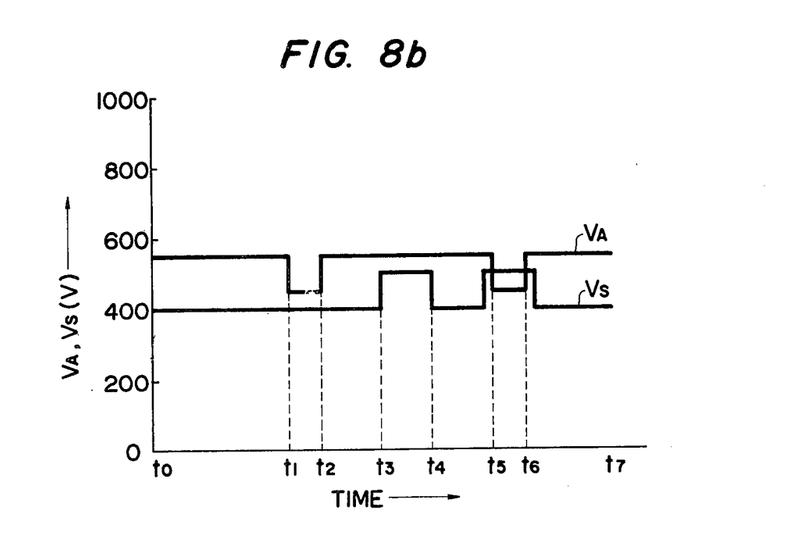
Figure 9A:
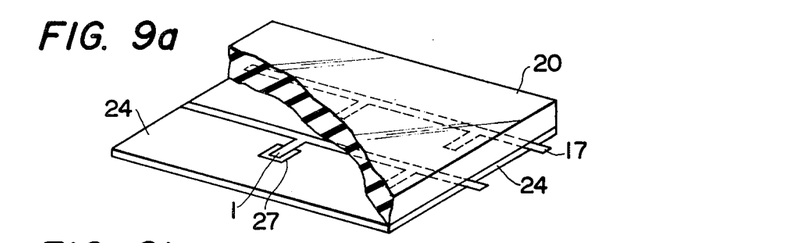
Figure 9B:
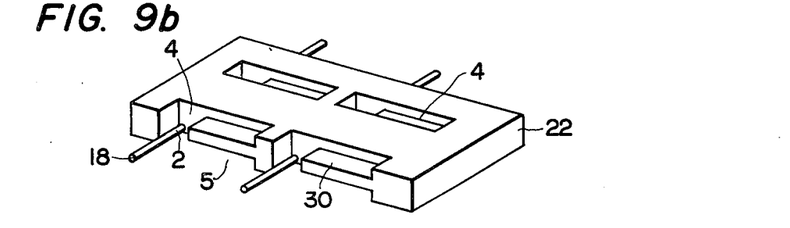
Figure 9C:
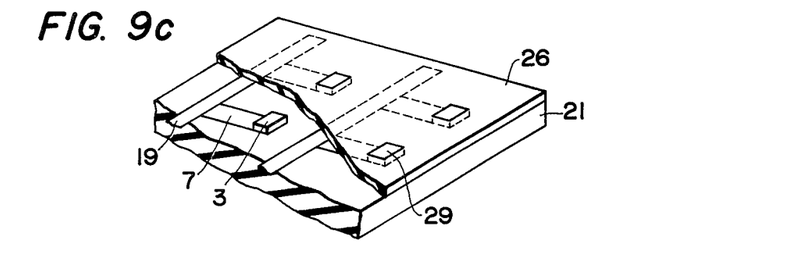
Figure 9D:
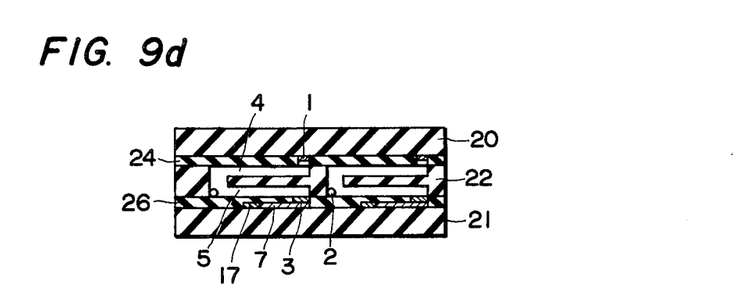

The method of driving the memory panel for executing this invention will now be described with reference to the panel applied voltage waveforms shown in FIGS. 8a and 8b. FIGS. 8a and 8b show the wave-forms of the panel constructed as shown in FIGS. 6 and having the static characteristics shown in FIG. 7 as driven by the method as constituted in FIG. 6. FIG. 8a shows the waveforms of the applied voltage ($V_A$) for the first (display) discharge space and the applied voltage ($V_S$) for the second (auxiliary) discharge space required for shifting the current $I_A$ from off to on (i.e., $I_S$ from on to off). FIG. 8b shows the voltages $V_A$ and $V_S$ for shifting the current $I_A$ from on to off (i.e., $I_S$ from off to on). In FIG. 8a, at a time $t_0$, the sum of the voltages of the applied voltages for the first display discharge space power source 9' and for the bias power source 8 in FIG. 1 is 700 volts, and the sum of the voltages of the applied voltages for the second auxiliary discharge space power sources 10' and 8 is 500 volts, and the panel is in $I_A$off and $I_S$on at this time. The operational point of the panel in FIG. 7 is shown by the point k at this time. When the time is between $t_1$ and $t_2$ in FIG. 8a, the voltage of the applied voltage of the first (display) discharge space power source 9' is raised by 100 volts, and the operational point is then moved to the point l in FIG. 7. The current $I_A$ is retained off. This shows a half-select. The voltage of the power source 9' during the time between $t_1$ and $t_2$ in FIG. 8a is returned to the original point, and the operational point is returned to the point k in FIG. 7. This shows non-select. The voltage of the power source 10' is lowered by 100 volts during the time between $t_3$ and $t_4$ to shift the operational point to m. The current $I_A$ is retained off. This shows half-select. The voltage of the power source 9' is raised by 100 volts during the time between $t_5$ and $t_6$ and the voltage of the power source 10' is lowered by 100 volts during the same time. The operational point of the panel is shifted to the point n so that $I_A$ becomes on and $I_S$ becomes off. This shows a selection. Though the operational point of the panel is shifted to the point k during the time $t_6$ and $t_7$, the current $I_A$ is retained on and $I_S$ is remained off.

The voltage values shown in FIG. 8a are mere example of the embodiment of this invention, and may not always hold the values shown. Assuming that the applied voltages for the first and second discharge space power sources at the point k in FIG. 7 are designated by $V_{Ab}$ and $V_{Sb}$, the potential between the the points k and m by $\Delta V_S$, $\Delta V_A$ and $\Delta V_S$ should satisfy the following inequality $$\Delta V_A < U_A < \Delta V_A + \Delta V_S$$

$$\Delta V_S < U_A$$

where $$U_S = (V_{Abd} - V_{Sm}) - V_{Ab} + V_{Sb} \quad (20)$$

The voltage of the cell in select state is shifted for the discharge exceeding the line of $V_A$ (on) designated by 120-126 in FIG. 7 under the aforementioned conditions.

If $I_A$ is on and $I_S$ is off at a time to, the states of the currents $I_A$ and $I_S$ are not varied at all even if the voltage of the waveform in FIG. 8a is applied to the panel.

Assuming that the panel is in $I_A$ on and $I_S$off at a time to in FIG. 8b. The operational point of the panel at this time is designated by O in FIG. 7. The operational point is shifted to the point P during the time between $t_1$ and $t_2$, but $I_A$ is remained on. This shows a half-select. The operational point is returned to the point O during the time between $t_2$ and $t_3$. This shows non-select state. The operational point is shifted to the point Q during the time between $t_3$ and $t_4$, but $I_A$ is retained on. This also shows half-select. $V_S$ is raised simultaneously when $V_A$ is lowered during the time between $t_5$ and $t_6$, the operational point is shifted to the point R, and $I_A$ becomes off and $I_S$ becomes on. This shows a selection. The operational point is returned to the point O during the time between $t_6$ and $t_7$, but $I_A$ is already off.

The voltage values designated in FIG. 8b are mere examples of the embodiment of this invention, and may not always hold the values shown. Assuming that the applied voltages for the first and second discharge space power sources at the point O in FIG. 7 are designated by $V_{Ab}$ and $V_{Sb}$, the potential between the points O and P by $\Delta V_A$, the potential between the points O and Q by $\Delta V_S$, $\Delta V_A$ and $\Delta V_S$ should satisfy the following inequality $$\Delta V_A < U_S$$

$$\Delta V_S < U_S < \Delta V_A + \Delta V_S$$

where $$U_S = (V_{Sbd} - V_{Am}) + V_{Ab} - V_{Sb} \quad (21)$$

The voltage of the cell in selected state is shifted for the discharge exceeding the line of $V_A$(off) designated by 118-125 in FIG. 7 under the aforementioned conditions.

If $I_S$ is off at a time to, the states of the current $I_A$ and $I_S$ in either on or off are not varied at all even if the voltage of the waveform in FIG. 8b is applied to the panel. If the non-select, half-select and selecting operations described as before are applied to the matrix panel shown in FIG. 1 or the panel of similar type, any of the first display or second auxiliary discharge can be broken down or extinguished in the panel. The auxiliary discharge anode may tentatively become cathode during the time between $t_3$ and $t_4$ or between $t_5$ and $t_6$ in FIG. 8a, and the display discharge anode may tentatively become cathode during the time between $t_5$ and $t_6$ in FIG. 8b, but these operations may not be badly affected for the memory function of the panel.

It should be noted that the embodiments of the method of driving a memory panel according to this invention may not be limited only to the aforementioned disclosure. For example, in FIG. 7, the discharge sustain point can be set to the point 1. The applied voltages for the first and second discharge spaces at the point 1 are designated by $V_{Ab}$ and $V_{Sb}$, respectively, and the potential between the points k and 1 by $\Delta V_A$, and the potential between the points 1 and n by $\Delta V_S$, and then $\Delta V_A$ and $\Delta V_S$ should satisfy the following inequality:

$$\Delta V_S - \Delta V_A < U_A < \Delta V_S$$

$$\Delta V_A < U_S$$

where $U_A$ and $U_S$ are defined by the equations (20) and (21). $\Delta V_S$ is lowered at the selecting point, only $\Delta V_A$ is lowered in the half-select point, and if both $\Delta V_A$ and $\Delta V_S$ are lowered, only the voltage of the selected cell exceeds a line of $V_A$ (on) designated by 120-126 to cause the discharge to be shifted.

Further, the discharge sustain point can be set to the point m in FIG. 7. Assuming that the applied voltages for the first and second discharge spaces at the point m are designated by $V_{Ab}$ and $V_{Sb}$, the potential between the points m and n by $\Delta V_A$, and the potential between the points k and m by $\Delta V_S$, $\Delta V_A$ and $\Delta V_S$ should satisfy the following inequality:

$$\Delta V_A - \Delta V_S < U_A < \Delta V_A$$

$$\Delta V_S < U_S$$

where $U_A$ and $U_S$ are defined by the equations (20) and (21). $\Delta V_A$ is raised at the selecting point, only $\Delta V_S$ is raised at the half-select point, and if both $\Delta V_A$ and $\Delta V_S$ are raised, only the voltage of the selected cell exceeds a line of $V_A$ (on) designated by 120-126 to cause the discharge to be shifted.

In addition, the discharge sustain point can be set to the point P in FIG. 7. Assuming that the applied voltages for the first and second discharge spaces at the point P are designated by $V_{Ab}$ and $V_{Sb}$, the potential between the points O and P by $\Delta V_A$, and the potential between the points P and R by $\Delta V_S$, $\Delta V_A$ and $\Delta V_S$ should satisfy the following inequality:

$$\Delta V_S - \Delta V_A < U_S < \Delta V_S$$

$$\Delta V_A < U_A$$

where $U_A$ and $U_S$ are defined by the equations (20) and (21). $\Delta V_S$ is raised in the selecting point, $\Delta V_A$ is raised at the half-select point, and both $\Delta V_A$ and $\Delta V_S$ are raised, only the voltage of the selected cell exceeds a line of $V_A$ (off) designated by 118-125 to cause the discharge to be shifted.

Furthermore, the discharge sustain point can be set to the point Q in FIG. 7. Assuming that the applied voltages for the first and second discharge spaces at the point Q are designated by $V_{Ab}$ and $V_{Sb}$, the potential between the points Q and R by $\Delta V_A$, and the potential between the points O and Q by $\Delta V_S$, $\Delta V_A$ and $\Delta V_S$ should satisfy the following inequality:

$$\Delta V_A < \Delta V_S < U_S < \Delta V_A$$

$$\Delta V_S < U_A$$

where $U_A$ and $U_S$ are defined by the equations (20) and (21). $\Delta V_A$ is lowered at the selecting point, only $\Delta V_S$ is lowered at the half-select point, and if both $\Delta V_A$ and $\Delta V_S$ are lowered, only the voltage of the selected cell exceeds a line of $V_A$(off) designated by 118-125 to cause the discharge to be shifted.

Figures 10A, 10B, 10C:
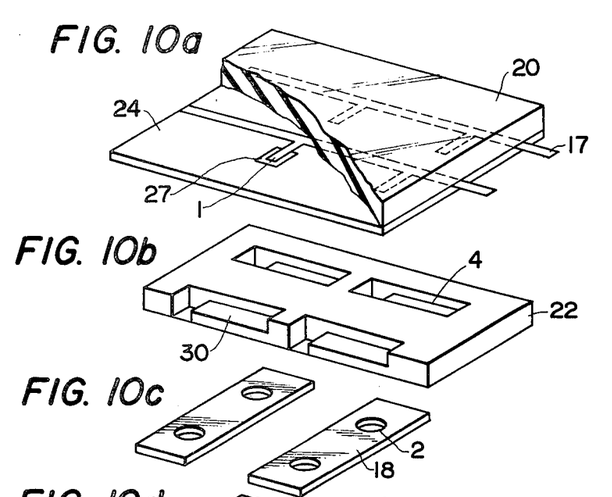
Figures 10D, 10E:
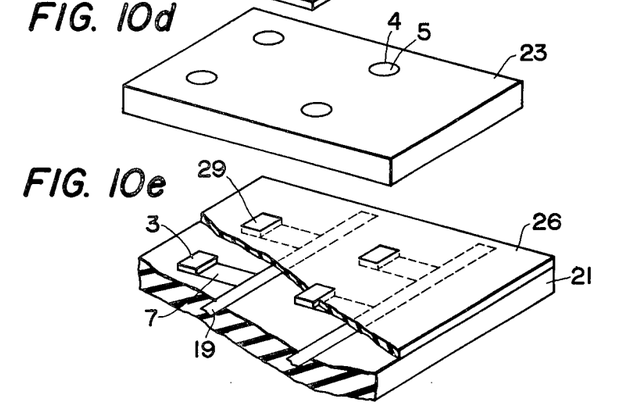

The aforementioned description has been conducted in case the panel of the structure shown in FIG. 6 is employed, but it should also be noted that in case this invention is executed for the panel of the structure shown in FIGS. 9 to 11 (or their various alternations may also be considered), the above described memory function shown in FIGS. 3 and 7 can also be performed in the same manner as described above.

FIGS. 9 show another embodiment of the panel of the structure constructed according to this invention. In FIG. 9, reference numeral 24 represents a display discharge anode cover glass, 26 common cathode cover glass, 27 holes perforated at the glass 24 for the display discharge anode, 29 holes perforated at the glass 26 for the common cathode. FIG. 9d shows an assembled panel in section and corresponds in model drawing to FIG. 4c. Both the display and auxiliary discharges may become positive column by adjusting the pressure and the type of gas filled in the panel.

Figure 10F:
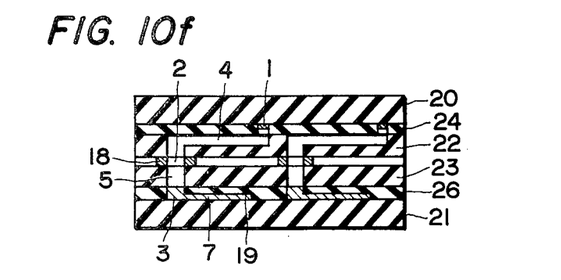
Figure 11A:
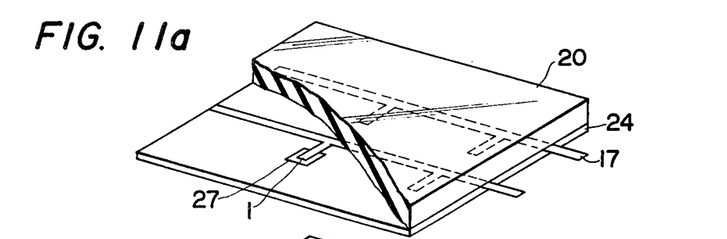
Figure 11B:
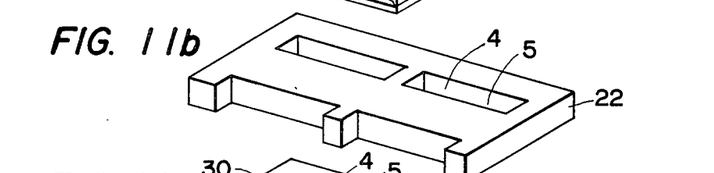
Figure 11C:
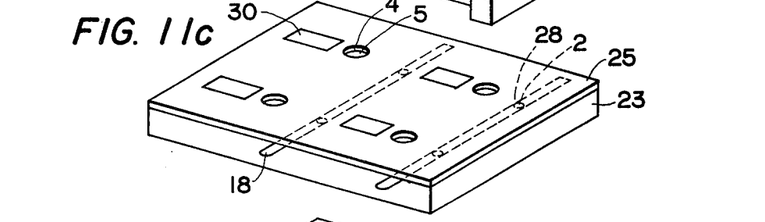
Figure 11D:
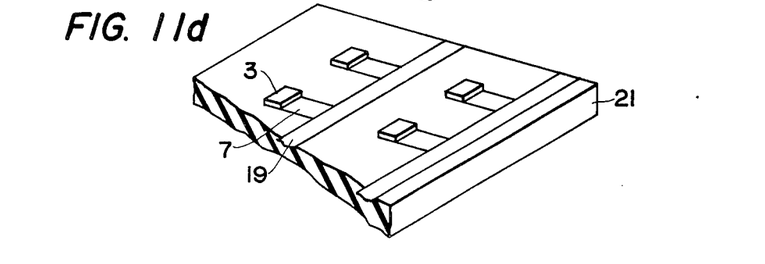
Figure 11E:
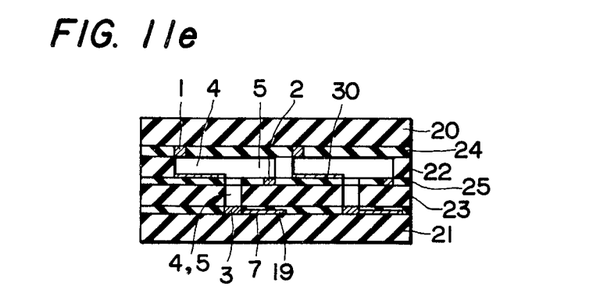

FIGS. 10 show still another embodiment of the panel of the structure constructed according to this invention, and FIG. 10f shows sectional view of the assembled panel. The model view of this panel corresponds to FIG. 4b. Positive column can be produced in part of the display discharge space and negative glow can also be produced in part of the auxiliary discharge space by adjusting the pressure of gas filled in the panel.

FIG. 11 shows still another embodiment of the panel of the invention. In FIG. 11, reference numeral 25 represents an auxiliary discharge anode cover glass, 28 holes perforated at the glass 25 for the auxiliary discharge anode. FIG. 11e shows a sectional view of the assembled panel of this embodiment, and the model view of this panel corresponds to FIG. 4a.

Figure 12:
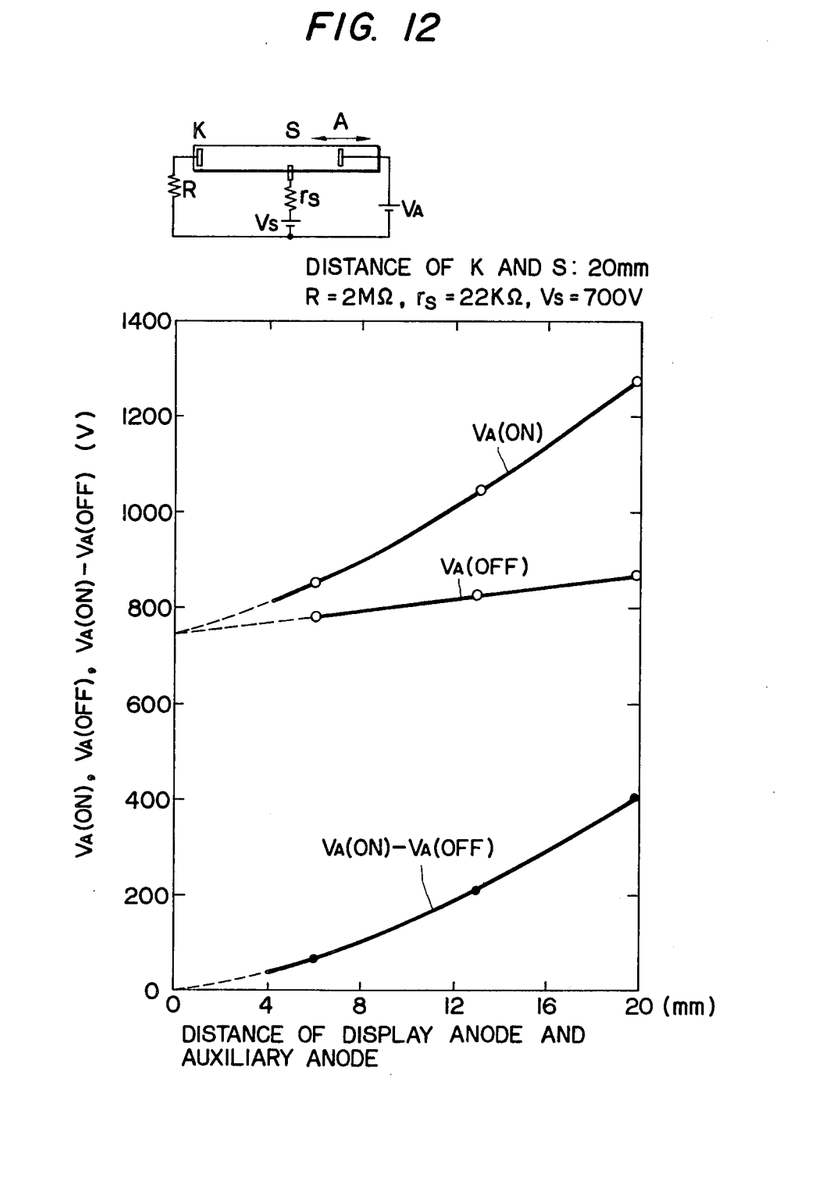
FIG. 12 is a characteristic view showing the measured result of the applied voltage to the respective electrodes as to the discharge display element having the structure shown in FIG. 4c.

FIG. 12 shows the measured results of the variations of $V_A$(on) and $V_A$(off) by varying the distance between the display and auxiliary discharge anodes of the cell having the configuration corresponding to that shown in FIG. 4c. The inner diameter of the measured cell is 3.3 mm$\phi$, filled gas is 5 Torr. Xe, the display discharge anode and cathode are made of nickel hollow column, the auxiliary discharge anode is made of iron-nickel wire. $R = 2\ M\Omega$, $\gamma_A = 0$, $\gamma_S = 22\ K\Omega$. However, substantially the same characteristics could be obtained as those shown in FIG. 12 with the cell of 0.3 mm$\phi$ of inner diameter thereof, 30 Torr Xe of filled gas. From FIG. 12, it will be appreciated that the values of $V_A$(on)$-V_A$(off) can be selected by 0 to 400 volts by varying the distance between the display and auxiliary discharge anodes. When the distance between the cathode and the auxiliary anode was varied while the distance between the display and the auxiliary discharge anodes was maintained constant, there was no variation of the values of $V_A$(on) and $V_A$(off).

If the difference between $V_A$(on) and $V_A$(off) is large, the panel can achieve a stable memory function even if the irregularity of the discharge characteristic among the cells in the panel is big, but the pulse voltage required for the address has to become high. Accordingly, it is desirable to reduce the value of $V_A$(on)$-V_A$(off) as low as possible for driving the panel in the range for performing stable memory function. According to this invention, as clearly seen from the measured results in FIG. 12, it becomes possible to arbitrarily select the value of $V_A$(on)$-V_A$(off) in broad range.

It is possible in the method of driving the panel of this invention to fill argon, neon, etc. in the panel instead of using luminous material 30 and to employ discharge visible light luminance as the display light in the panel.

It should be understood from the foregoing description that the present invention can accomplish the following various advantages and features:

(1) Only one protecting resistor is required for the first and second discharges.

(2) The memory function is not affected by the variations of the resistor 7.

(3) The display discharge current is varied by the variations of the resistor 7, but the display luminance can substantially be kept constant if the current region that the luminance become saturated for the discharge current is employed.

(4) Small value such as 1 or more can be achieved for the memory margin by employing the discharge of high breakdown voltage as positive column.

(5) Power consumption can be saved since one discharge is extinguished if the other discharge is broken down.

(6) The first and second discharges are supplied with trigger to each other for breaking down the discharge to each other, and accordingly there exists less irregularity of $V_A$(on) and $V_A$(off).

(7) Since the voltage required for switching can be kept low regardless of the amplitude of the discharge maintaining voltage, IC can be employed for the switching element of the panel.

(8) Since the breakdown and extinction of the display discharge are conducted without flowing the discharge current but by executing the auxiliary discharge in the display discharge space, high speed switching can be accomplished to be used for the display of the moving picture having half tone such as TV display.

(9) Random access to the respective discharge display cell is enabled to be employed for the data display for the terminal units of a computer.

(10) There occurs no phenomenon that the display luminance is varied by the change of the current at half-select point.

(11) The second discharge can be extinguished without affecting the first discharge when the second discharge is unnecessary.

(12) In case the second discharge is broken down in the state both the first and second discharges are all extinguished, the discharge rise time can be shortened by employing the second discharge of the previous stage as trigger for the discharge.

(13) In similar case that the second discharge is broken down in the state both the first and second discharges are all extinguished, the discharge rise time can be shortened by providing trigger discharge exclusive for the second discharge.

(14) The half tone of the display light can be achieved by varying the current value of the display discharge or breakdown time.

What is claimed is:

1. A method of driving a flat discharge panel disposed in matrix type,
said matrix composing:
a plurality of first electrodes,
said first electrodes being laterally disposed and commonly connected in each lateral line,
a plurality of second electrodes,
said second electrode being longitudinally disposed and commonly connected in each longitudinal line,
a plurality of third electrodes,
said respective third electrodes forming a plurality of first discharge spaces together with said respective first electrodes and forming a plurality of second discharge spaces together with said respective second electrodes, and said respective second discharge spaces being formed in common as part of said respective first discharge spaces,
resistors connected in series with said respective third electrodes,
said third electrodes commonly connected all via said resistors,
discharging gas filled in said first and second discharge spaces,
said method comprising the steps of:
applying predetermined applied voltages $V_A$ and $V_S$ for the first and second discharge spaces in advance between said first and third electrodes, and between said second and third electrodes, respectively, where said voltages $V_A$ and $V_S$ satisfy the relation, $$V_A < V_A(\text{on}) = V_S + (V_{Abd} - V_{Sm})$$

where
$V_A$(on) is the applied voltage for the first discharge required for shifting the discharge from the second to the first discharge spaces,
$V_{Abd}$ is the first break down voltage when the second discharge space is discharged, and
$V_{Sm}$ is the second discharge maintenance voltage establishing self-supporting discharge in either of the first and second discharge spaces,
varying at least one of $V_A$ and $V_S$ so that the values of said $V_A$ and $V_S$ of the electrodes of the discharge spaces to be selected and presenting the self-supporting discharge in the second discharge space satisfies $V_A > V_A(\text{on})$,
varying at least one of said $V_A$ and $V_S$ so that the values of said $V_A$ and $V_S$ between the electrodes in half-selection mode satisfy, $$V_A < V_A(\text{on})$$

thereby shifting or maintaining the self-supporting discharge in the first and second discharge spaces in the discharge spaces to be selected.

2. A method as defined in claim 1, wherein said second and third steps comprise tentatively raising the applied voltage $V_A$ for the first discharge and tentatively lowering the applied voltage $V_S$ for the second discharge thereby shifting the self-supporting discharge in the second discharge space to the first discharge space to be selected.

3. A method as defined in claim 1, wherein
said second step includes lowering the applied voltage $V_S$ for the second discharge, and
said third step includes the steps of lowering the applied voltage $V_A$ for the first discharge and lowering the applied voltage $V_S$ for the second discharge.

4. A method as defined in claim 1, wherein
said second step includes raising the applied voltage $V_A$ for the first discharge, and
said third step includes the steps of raising the applied voltage $V_S$ for the second discharge and raising the applied voltages $V_A$ and $V_S$ for the first and second discharges.

5. A method of driving a flat discharge panel disposed in matrix type,
said matrix comprising:
a plurality of first electrodes,
said first electrodes being laterally disposed and commonly connected in each lateral line,
a plurality of second electrodes,
said second electrodes being longitudinally disposed and commonly connected in each longitudinal line,
a plurality of third electrodes, said respective third electrodes forming a plurality of first discharge spaces together with said respective first electrodes and forming a plurality of second discharge spaces together with said respective second electrodes, and said respective second discharge spaces being formed in common with said respective first discharge spaces, resistors connected in series with said respective third electrodes, said third electrodes commonly connected all via said resistors, discharging gas filled in said first and second discharge spaces, said method comprising the steps of, applying predetermined applied voltages $V_A$ and $V_S$ for the first and second discharge spaces in advance between said first and third electrodes, and between said second and third electrodes, respectively, where said $V_A$ and $V_S$ satisfy the relationship $$V_A > V_A(\text{off}) = V_S - (V_{Sbd} - V_{Am})$$

where $V_A(\text{off})$ is the applied voltage for the first discharge space required for shifting the discharge from the first to the second discharge spaces, $V_{Sbd}$ is a second breakdown voltage when the first discharge space is discharged, and $V_{Am}$ is a first discharge maintaining voltage establishing self-supporting discharge in either of the first and second discharge spaces, varying at least one of said $V_A$ and $V_S$ so that the values of said $V_A$ and $V_S$ of the electrodes of the dicharge space to be selected and presenting the self-supporting discharge in the first discharge space satisfy $$V_A < V_A(\text{off}),$$

varying at least one of said $V_A$ and $V_S$ so that the values of said $V_A$ and $V_S$ between the electrodes of the discharge spaces under half-selection mode satisfy $$V_A > V_A(\text{off}),$$

thereby shifting the self-supporting in the first discharge space into the second discharge space to be selected.

6. A method as defined in claim 5, wherein said second and third steps comprise tentatively lowering the applied voltage $V_A$ for the first discharge and tentatively raising the applied voltage $V_S$ for the second discharge thereby shifting the self-supporting discharge in the first discharge space to the second discharge space to be selected.

7. A method as defined in claim 5, wherein said second step includes raising the applied voltage $V_S$ for the second discharge, and said third step includes the steps of raising the applied voltage $V_A$ for the first discharge and raising the applied voltages $V_A$ and $V_S$ for the first and second voltages.

8. A method as defined in claim 5, wherein said second step includes lowering the applied voltage $V_A$ for the first discharge, and said third step includes the steps of lowering the applied voltage $V_S$ for the second discharge and lowering the applied voltages $V_A$ and $V_S$ for the first and second discharges.

* * * * *